United States Patent
Yokose et al.

Patent Number: 5,868,871
Date of Patent: Feb. 9, 1999

[54] METHOD AND APPARATUS FOR CARBURIZING, QUENCHING AND TEMPERING

[75] Inventors: Keiji Yokose; Fumitaka Abukawa; Hidetoshi Juryosawa; Jun Takahashi; Shinichi Takemoto; Hideki Inoue, all of Tokyo, Japan

[73] Assignee: Dowa Mining Co., Ltd., Tokyo, Japan

[21] Appl. No.: 867,448

[22] Filed: Jun. 2, 1997

[30] Foreign Application Priority Data

Jun. 6, 1996 [JP] Japan .................................. 8-144113
Mar. 28, 1997 [JP] Japan .................................. 9-78108

[51] Int. Cl.$^6$ .................................. C23C 8/20; C23C 8/22
[52] U.S. Cl. .......................... 148/211; 148/226; 266/252
[58] Field of Search ..................... 266/252; 148/211, 148/226

[56] References Cited

U.S. PATENT DOCUMENTS 4,807,853  2/1989  Murakami et al. ................ 266/252
5,225,144  7/1993  Nanba et al. ..................... 266/252

FOREIGN PATENT DOCUMENTS 406017123  1/1994  Japan ............................... 148/226
406025736  2/1994  Japan ............................... 148/226

*Primary Examiner*—Deborah Yee
*Attorney, Agent, or Firm*—Oliff & Berridge, PLC

[57] ABSTRACT

Method and apparatus for carburizing, quenching and tempering workpieces, by which the step of carburizing can be incorporated into a machining and manufacturing process to be performed by an on-line machining and manufacturing system as one stage thereof, and by which high-quality treatment or processing can be achieved without occurrences of variation in quality among heat-treated products. In this apparatus, a preheating chamber (2), six carburizing chambers (5a to 5f), a cooling chamber (6), a reheating chamber (7), a quenching chamber (8) are placed around an intermediate chamber (4) having a transport device (12). Further, a high-frequency induction heating technique is used for heating each of major ones of the treatment or processing chambers. Moreover, a plasma carburizing method is performed in the carburizing chambers. Furthermore, workpieces, which are successively carried into this apparatus through a machining and manufacturing line, are assigned and distributed to the chambers, respectively, and are then treated or processed therein. Thus, the process of carburizing, quenching and tempering can be performed without stagnation.

15 Claims, 10 Drawing Sheets

F I G. 7
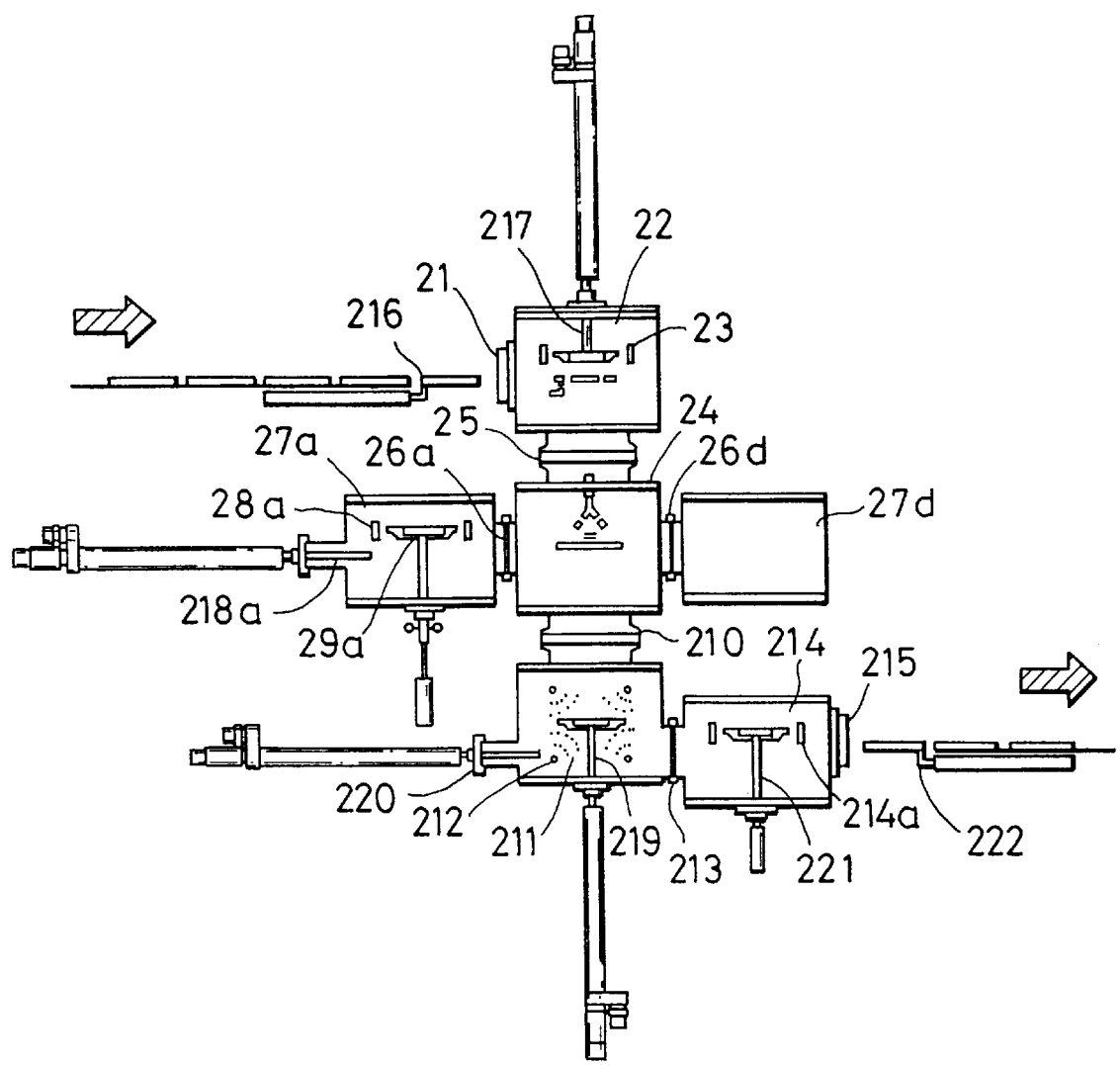

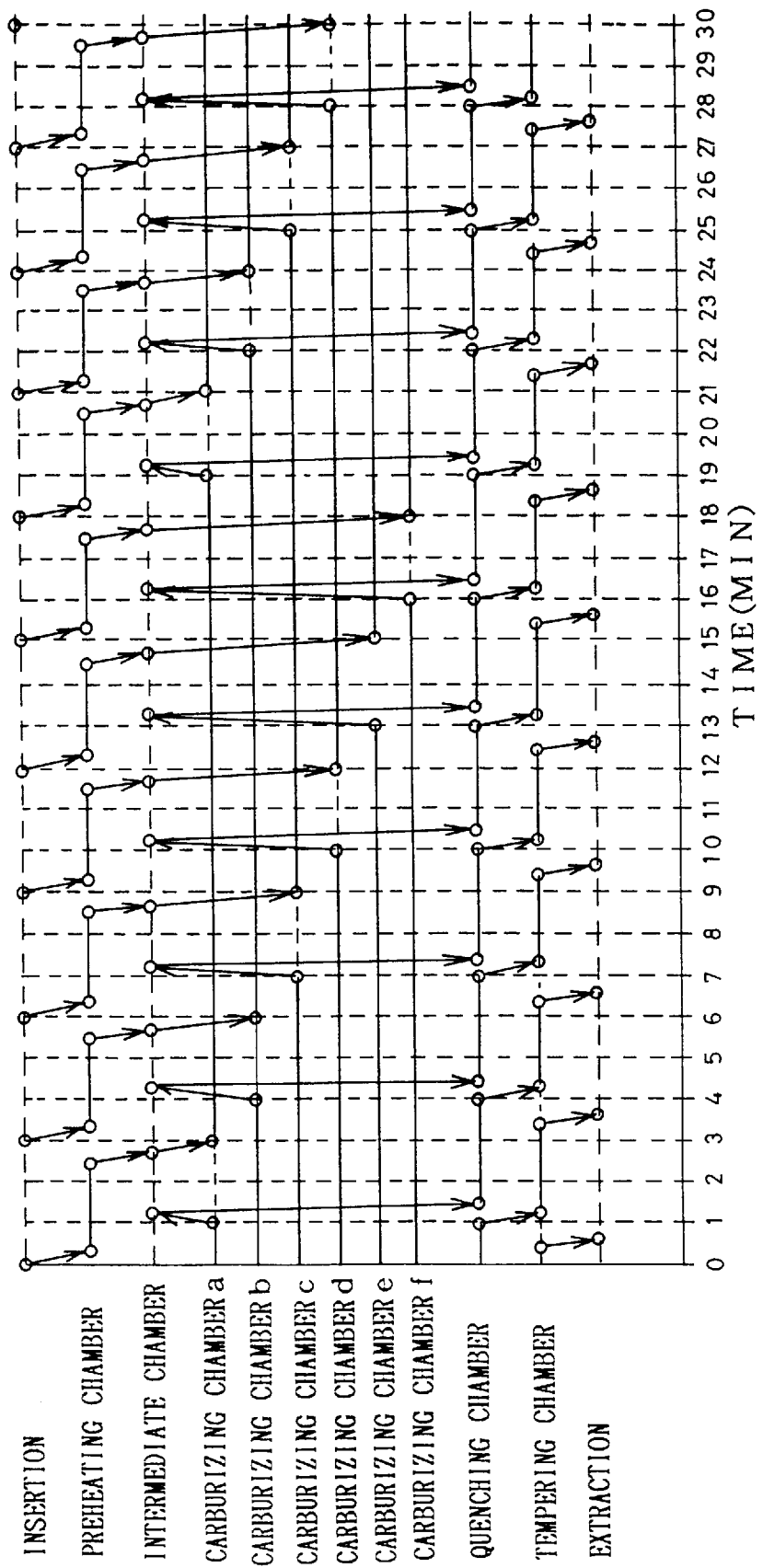
F I G. 9

METHOD AND APPARATUS FOR CARBURIZING, QUENCHING AND TEMPERING

BACKGROUND OF THE INVENTION

1. Field of the Invention

The present invention generally relates to a method and apparatus for carburizing, quenching and tempering, and, more particularly, to a method for carburizing, quenching and tempering, by which a step of carburizing can be incorporated into a machining and manufacturing process to be performed by an on-line machining and manufacturing system as one stage thereof, and to an apparatus therefor.

2. Description of the Related Art

Hitherto, continuous gas carburize/quench furnaces of the tray pusher type or of the roller hearth type have been used as apparatuses for carburizing and quenching, so as to carry out the mass production of (steel) products. The continuous gas carburize/quench furnace of any of such types usually provides around-the-clock operation in what is called a heat-treating shop, which is away from a machining shop, by being made to be offline from a machining (process) apparatus. Further, the furnace has employed a producing method by which a heat treatment is performed according to a batch system that is adapted to set up a large number of workpieces (such as parts), which are to be processed, on trays, respectively.

Meanwhile, the process to be performed by such a conventional continuous gas carburize/quench furnace is composed of steps illustrated in FIG. 10.

Namely, the cutting of the workpieces are first performed in the machining shop. Subsequently, the cut workpiece is transported from the machining shop to the heat-treating shop which is made to be offline and is away therefrom. When the workpieces arrive at the heat-treating shop, the set-up step of setting up the workpiece on a tray is performed by jigs. After cleaning, the workpieces are loaded into the continuous gas carburize/quench furnace. Thence, the steps of carburizing and quenching are performed in the continuous gas carburize/quench furnace. Subsequently, the workpieces are cleaned and tempered. Upon completion of a sequence of heat-treating steps, a step of taking the workpiece out of the tray and further disassembling the workpiece is performed. The disassembled workpiece is transported to the machining shop which is made to be offline and is away from the heat-treating shop. Thereafter, in the marching shop, the grinding of the workpiece is performed.

The aforementioned process of FIG. 10, which is to be performed in the conventional continuous gas carburize/quench furnace, has the following problems.

i) Because the machining shop is placed apart from the heat-treating shop, a transport system and personnel therefor are needed. Moreover, it is necessary to stock workpieces, which are to be processed (or treated), for a time period having a predetermined length.

ii) There is the necessity of the set-up step of setting a workpiece on a tray by using a jig so as to charge the workpiece into the furnace. Moreover, the disassembling step of taking out the workpiece, which has been set on the tray, therefrom is needed upon completion of the heat-treating step.

iii) It takes time to raise and lower the temperature of the workpiece. The lead time of the heat treatment is long. Thus, the process from the step of inserting or charging the workpiece into the furnace to the step of extracting thereof from the furnace is time-consuming.

iv) When starting up the furnace, it takes long time to perform seasoning for regulating (or controlling) the furnace atmosphere.

v) Batch processing results in variation in quality among the heat-treated workpieces.

The present invention is accomplished to solve the aforementioned problems.

Accordingly, an object of the present invention is to provide a method for carburizing, quenching and tempering workpieces, by which the step of carburizing can be incorporated into a machining and manufacturing process to be performed by an on-line machining and manufacturing system as one stage thereof, and by which high-quality treatment or processing can be achieved without occurrences of variation in quality among heat-treated products.

Further, another object of the present invention is to provide an apparatus for such a method.

SUMMARY OF THE INVENTION

To achieve the foregoing object, in accordance with an aspect of the present invention, there is provided a method (hereunder sometimes referred to as a first method of the present invention) of carburizing, quenching and tempering workpieces, which comprises: a preheating step of preheating a workpiece (or an object) to a carburizing temperature; a carburizing step of carburizing the workpiece at the carburizing temperature after preheating the workpiece; a quenching step of quenching the workpiece after carburizing the workpiece; and a tempering step for tempering the workpiece after quenching the workpiece. In this method, the aforesaid workpieces are supplied onto a machining and manufacturing line for machining and manufacturing a product. Further, each of the aforesaid steps of this method is performed in accordance with a supplying speed, at which the workpiece is supplied onto the aforesaid machining and manufacturing line, in such a manner that the flow or movement of the workpieces on the aforesaid machining and manufacturing line is substantially prevented from being stopped.

Thus, the step of carburizing can be incorporated into the machining and manufacturing process to be performed by an on-line machining and manufacturing system as one stage thereof. Moreover, the high-quality treatment or processing can be achieved without occurrences of variation in quality among heat-treated products.

In accordance with another aspect of the present invention, there is provided a method (hereunder sometimes referred to as a second method of the present invention) of carburizing, quenching and tempering workpieces, which comprises: a preheating step of preheating a workpiece to a carburizing temperature; a carburizing step of carburizing the workpiece at the carburizing temperature after preheating the workpiece; a quenching step of quenching the workpiece after carburizing the workpiece; and a tempering step for tempering the workpiece after quenching the workpiece. In this method, the aforesaid workpieces are supplied onto a machining and manufacturing line for machining and manufacturing a product. Further, each of the aforesaid steps of this method is performed by providing treatment (or processing) means of the number, which are necessary for performing each of the aforesaid steps without substantially stopping the flow or movement of the workpieces on the aforesaid machining and manufacturing line, correspondingly to a time period, which is necessary for performing a corresponding one of the aforesaid steps, and by setting one workpiece or a set of two workpieces or more as the unit of treatment (or processing), as needed, and then distributing and supplying the workpieces in the units of treatment in sequence to the treatment means.

In the case of an embodiment (hereunder sometimes referred to as a third method of the present invention) of the first or second method of the present invention, preheating means for performing the aforesaid preheating step is configured separately from carburizing means for performing the aforesaid carburizing step.

Further, the aforesaid preheating means employs a high frequency induction heating process to thereby establish a preheating time period in such a manner as to be sufficiently shorter than a time interval between the supplies of the workpieces in the units of treatment through the aforesaid machining and manufacturing line. Furthermore, the number of the aforesaid preheating means is set at one.

Moreover, the number of the aforesaid carburizing means is set in such a manner as to meet the condition given by the following inequality:

$Z \geq X/Y$ where X denotes a time period taken for performing the aforesaid carburizing step; Y the time interval between the supplies of the workpieces in the units of treatment through the aforesaid machining and manufacturing line; and Z the number of the aforesaid carburizing means for performing the aforesaid carburizing step.

In the case of an embodiment (hereunder sometimes referred to as a fourth method of the present invention) of the third method of the present invention, the aforesaid carburizing means for performing the aforesaid carburizing step comprises means for carburizing by a plasma carburizing method to be performed by causing a glow discharge between the aforesaid carburizing means and the workpiece while maintaining the temperature of the workpiece at the carburizing temperature, to thereby reduce a starting (or activating) time, which is taken to start performing the aforesaid method of carburizing, quenching and tempering the workpieces, to become close to a start-up time, which is taken to cause the aforesaid machining and manufacturing line to start working (or operating), so that the performance of the aforesaid method of carburizing, quenching and tempering the workpieces is started substantially in synchronization with the starting of an operation of the aforesaid machining and manufacturing line and that the performance of the aforesaid method of carburizing, quenching and tempering the workpieces is stopped near to the stopping of the operation of the aforesaid machining and manufacturing line.

In the case of an embodiment (hereunder sometimes referred to as a fifth method of the present invention) of the fourth method of the present invention, a high-frequency induction heating process is used as a process of maintaining the temperature of the workpiece at the carburizing temperature.

In the case of an embodiment (hereunder sometimes referred to as a sixth method of the present invention) of the third, fourth or fifth method of the present invention, the high frequency used in the aforesaid high-frequency induction heating process is set in such a way as to range from 0.5 kHz to 3 kHz.

In the case of an embodiment (hereunder sometimes referred to as a seventh method of the present invention) of any one of the first to sixth methods of the present invention, the aforesaid carburizing step is performed at a temperature, which is not lower than 950 degrees centigrade and is not higher than 1200 degrees centigrade, so as to reduce the length of a time period taken to accomplish the aforesaid carburizing step. Further, a cooling step of cooling the workpieces to a temperature, which is not higher than A1 transformation temperature (or point), and a reheating step of reheating the workpiece, which has been cooled in this cooling step, to a quenching temperature are added between the aforesaid carburizing step and the aforesaid quenching step.

In the case of an embodiment (hereunder sometimes referred to as an eighth method of the present invention) of the seventh method of the present invention, the aforesaid cooling means and the aforesaid reheating means are provided in such a manner as to meet conditions given by the following inequalities:

$C \geq M/Y, H \geq N/Y$ where M designates a time taken to accomplish the aforesaid cooling step of cooling the workpiece to a temperature which is not higher than the aforesaid A1 transformation temperature; N a time taken to accomplish the aforesaid reheating step of reheating the workpiece, which has been cooled in the aforesaid cooling step, to the quenching temperature; Y the time interval between the supplies of the workpieces in the units of treatment through the aforesaid machining and manufacturing line; C the number of the aforesaid cooling means for performing the aforesaid cooling step; and H the number of the aforesaid reheating means for performing the aforesaid reheating step.

In accordance with another aspect of the present invention, there is provided an apparatus (hereunder sometimes referred to as a first apparatus of the present invention) of carburizing, quenching and tempering workpieces, which comprises: one or more preheating devices each for preheating a workpiece to a carburizing temperature; one or more carburizing devices each for carburizing the workpiece at the carburizing temperature after preheating the workpieces; one or more quenching devices each for quenching the workpiece after carburizing the workpiece; one or more tempering devices each for tempering the workpiece after quenching the workpiece; and one or more transport devices each for performing an operation of setting one workpiece or a set of two workpieces or more as a unit of treatment and then carrying the workpieces into each of the aforesaid devices and for performing an operation of carrying out the workpieces therefrom. The aforesaid apparatus of carburizing, quenching and tempering workpieces is placed in a machining and manufacturing line for machining and manufacturing products.

Further, each of a set of the aforesaid preheating devices, a set of the aforesaid carburizing devices, a set of the aforesaid quenching devices and a set of the aforesaid tempering devices, has the corresponding devices of the number, which are necessary for performing a corresponding one of the aforesaid steps substantially without stopping the flow or movement of the workpieces on the aforesaid machining and manufacturing line, correspondingly to a time period, which is necessary for performing the corresponding one of the aforesaid steps.

Moreover, a transporting unit for transporting workpieces, which are sequentially supplied in the units of treatment (or processing) from a preceding step, is provided corresponding to each of the kinds of such devices so that the workpieces are sequentially supplied to such devices, respectively.

In the case of an embodiment (hereunder sometimes referred to as a second apparatus of the present invention) of the first apparatus of the present invention, the aforesaid preheating device is provided with a high frequency induction heating device and the number of the one or more aforesaid preheating devices provided in the aforesaid apparatus is 1.

Moreover, the number Z of the aforesaid carburizing devices is set in such a manner as to meet the condition given by the following inequality:

$Z \geq X/Y$ where X denotes a time period taken for performing the aforesaid carburizing step; and Y the time interval between the supplies of the workpieces in the units of treatment through the aforesaid machining and manufacturing line.

In the case of an embodiment (hereunder sometimes referred to as a third apparatus of the present invention) of the first or second apparatus of the present invention, the aforesaid carburizing device comprises: a vacuum carburizing chamber; a plasma carburizing unit for performing plasma carburizing by causing a glow discharge between the aforesaid carburizing means and the workpiece; and a heating unit for maintaining the temperature of the workpiece at a carburizing temperature.

In the case of an embodiment (hereunder sometimes referred to as a fourth apparatus of the present invention) of the third apparatus of the present invention, the aforesaid heating unit for maintaining the temperature of the workpiece at the carburizing temperature is a high frequency induction heating unit.

In the case of an embodiment (hereunder sometimes referred to as a fifth apparatus of the present invention) of any one of the first to fourth apparatuses of the present invention, there are further provided one or more cooling devices each for performing a cooling step of cooling the workpieces to a temperature, which is not higher than A1 transformation temperature, and one or more reheating devices each for reheating the workpiece, which has been cooled by this cooling device, to a quenching temperature.

In the case of an embodiment (hereunder sometimes referred to as a sixth apparatus of the present invention) of the fifth apparatus of the present invention, the aforesaid cooling device and the aforesaid reheating device are provided in such a manner as to meet conditions given by the following inequalities:

$C \geq M/Y, H \geq N/Y$ where M designates a time taken to accomplish the aforesaid cooling step of cooling the workpiece to a temperature which is not higher than the aforesaid A1 transformation temperature; N a time taken to accomplish the aforesaid reheating step of reheating the workpiece, which has been cooled in the aforesaid cooling step, to the quenching temperature; Y the time interval between the supplies of the workpieces in the units of treatment through the aforesaid machining and manufacturing line; C the number of the aforesaid cooling devices for performing the aforesaid cooling step; and H the number of the aforesaid reheating devices for performing the aforesaid reheating step.

In the case of an embodiment (hereunder sometimes referred to as a seventh apparatus of the present invention) of any one of the first to sixth apparatuses of the present invention, the aforesaid tempering devices for performing a tempering step are provided in such a manner as to meet the condition given by the following inequality:

$W \geq L/Y$ where L denotes a time period taken for performing the aforesaid tempering step; Y the time interval between the supplies of the workpieces in the units of treatment through the aforesaid machining and manufacturing line; and W the number of the aforesaid tempering devices for performing the aforesaid tempering step.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 7 is a schematic longitudinal sectional view of still another apparatus for carburizing, quenching and tempering workpieces, which is "Embodiment 2" of the present invention;

FIG. 9 is a time chart illustrating another method for carburizing, quenching and tempering workpieces in this apparatus embodying the present invention, namely, "Embodiment 2" of the present invention.

DETAILED DESCRIPTION OF THE PREFERRED EMBODIMENTS

Hereinafter, methods of carburizing, quenching and tempering workpieces according to the present invention, and apparatuses for carburizing, quenching and tempering workpieces according to the present invention, namely, the preferred embodiments of the present invention will be described in detail by referring to the accompanying drawings.

Embodiment 1

Figure 1:
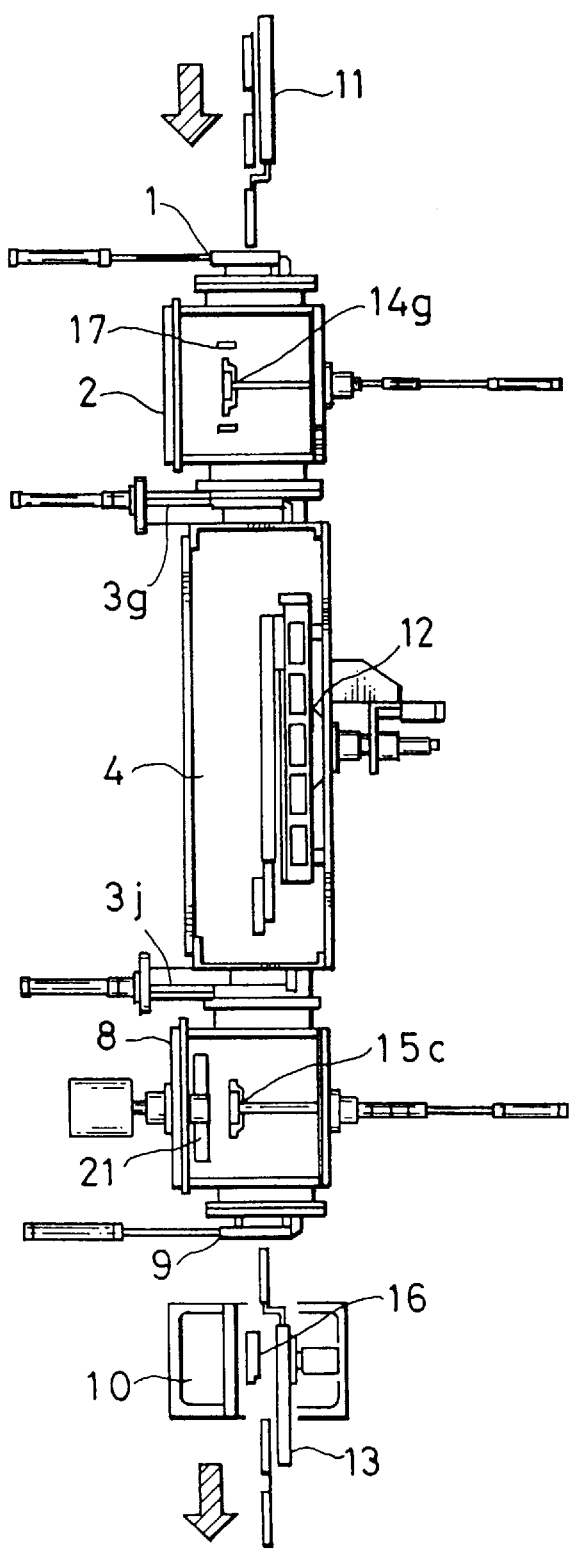
FIG. 1 is a schematic longitudinal sectional view of an apparatus for carburizing, quenching and tempering workpieces, which is "Embodiment 1" of the present invention.
Figure 2:
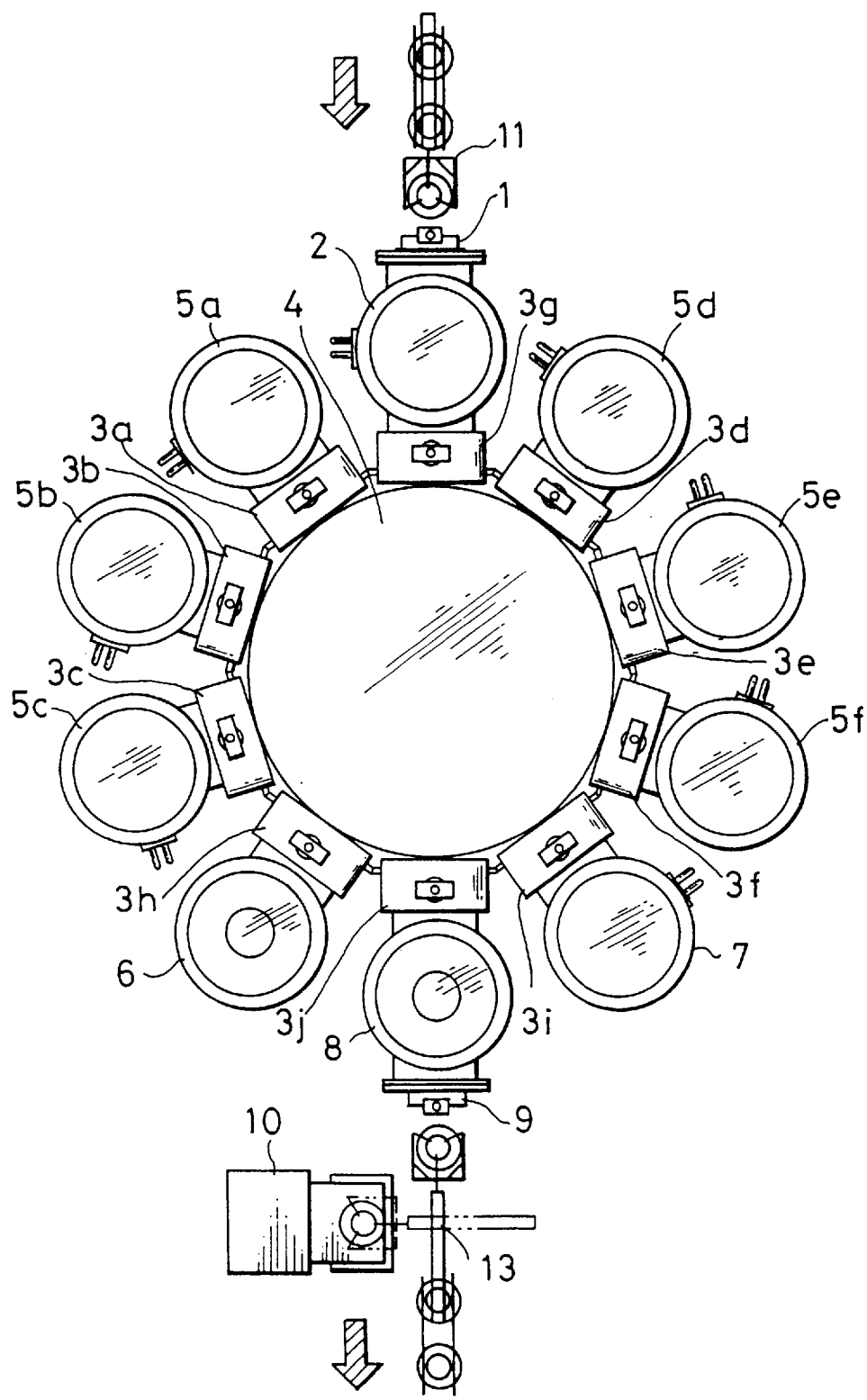
FIG. 2 is a schematic plan view of the apparatus for carburizing, quenching and tempering workpieces, namely, "Embodiment 1" of the present invention.

FIG. 1 illustrates a schematic longitudinal sectional view of an apparatus for carburizing, quenching and tempering workpieces, which is a first embodiment of the present invention. FIG. 2 is a schematic plan view of this apparatus.

The apparatus for carburizing, quenching and tempering workpieces, which is this embodiment of the present invention, is provided with a preheating chamber 2, an intermediate chamber 4, carburizing chambers 5a to 5f, a cooling chamber 6, a reheating chamber 7, a quenching chamber 8 and a tempering chamber 10. The preheating chamber 2 is provided with an entrance door 1 through which workpieces (or objects) to be treated (or processed)

are carried into the chamber 2. Further, an intermediate door 3g is provided in a coupling portion between the preheating chamber 2 and the intermediate chamber 4. Further, each of intermediate doors 3a to 3f is provided in a coupling (or joint) portion between the intermediate chamber 4 and a corresponding one of carburizing chambers 5a to 5f placed therearound. Moreover, intermediate doors 3h, 3i and 3j are provided in a coupling portion between the intermediate chamber 4 and the cooling chamber 6, a coupling portion between the intermediate chamber 4 and the reheating chamber 7, and a coupling portion between the intermediate chamber 4 and the quenching chamber 8, respectively. Furthermore, an exit door 9, through which workpieces are carried out of the quenching chamber 8, is provided therein. In addition, although an induction heating coil for performing high-frequency induction heating is provided in each of the preheating chamber 2, the carburizing chambers 5a to 5f, the reheating chamber 7 and the tempering chamber 10, only an induction heating coil 17 provided in the preheating chamber 2 is shown in FIG. 1 and the illustration of the other induction heating coils is omitted therein, for simplicity of drawing. Besides, although a supporting base for supporting the workpiece in upwardly and downwardly movable manner is provided in each of the preheating chamber 2, the carburizing chambers 5a to 5f, the cooling chamber 6, the reheating chamber 7 and the quenching chamber 8, only a supporting base 14g provided in the preheating chamber 2 and another supporting base 15c provided in the quenching chamber 8 are shown in FIG. 1 and the illustration of the other supporting bases is omitted. Further, a transport unit 11 for carrying workpieces into the preheating chamber 2 through the entrance door 1 is provided in the vicinity of the preheating chamber 2. Further, a transport unit 12 for taking out workpieces from the preheating chamber 2 and for taking in workpieces to and taking out workpieces from the carburizing chambers 5a to 5f, the cooling chamber 6, the reheating chamber 7 and the quenching chamber 8 is provided in the intermediate chamber 4. Moreover, a transport unit 13 for transporting workpieces, which are carried out of the quenching chamber 8 through the exit door 9, to the tempering chamber 10 and for charring out the workpiece from the tempering chamber 10 in the next step is provided in the proximity of the quenching chamber 8 and the tempering chamber 10. Furthermore, although cooling fans are provided in the cooling chamber 6 and the quenching chamber 8, respectively, only the cooling fan 21 provided in the quenching chamber 8 is shown in FIG. 1 and the illustration of the other cooling fan is omitted. Incidentally, the drawing of a vacuum pumping system, a gas injection (or introduction) system and a power supply system is omitted.

The preheating chamber 2 used to receive workpieces, which have been machined by a machining apparatus (not shown) and transported by the transport unit 11, through the entrance door 1 and to rapidly heat the received workpieces to a carburizing temperature is a vacuum-sealable chamber. Further, the preheating chamber 2 has a double wall structure for the water-cooling of the walls thereof and is provided with the supporting base 14g, on which the workpiece is set, and the induction heating coil 17 for preheating the workpiece are provided therein. As will be described later, the preheated workpiece is conveyed to the intermediate chamber 4 through the intermediate door 3g.

The intermediate chamber 4 is also a vacuum-sealable chamber for temporarily holding the workpieces. Further, the chamber 4 is provided with a transport unit 12 that is adapted to receive the workpieces, which have been preheated, through the intermediate door 3g and serially insert the workpieces into the carburizing chambers 5a to 5f through the intermediate doors 3a to 3f, respectively. As will be described later, the aforementioned transport unit 12 is used for transporting the workpieces from the carburizing chambers 5a to 5f to the cooling chamber 6, for transporting the workpieces from the cooling chamber 6 to the reheating chamber 7 and for transporting the workpieces from the reheating chamber 7 to the quenching chamber 8.

The carburizing chambers 5a to 5f are vacuum-sealable chambers for carburizing the workpieces transported thereto by the transport unit 12, respectively. Further, these carburizing chambers have double wall structures for the water-cooling of the walls thereof. Moreover, each of the carburizing chambers is provided with a corresponding one of the supporting bases, which is adapted to support the workpieces in an upwardly and downwardly movable manner (incidentally, in FIG. 1, the supporting bases other than the base 14g are not shown), and a corresponding one of the induction heating coils (not shown in FIG. 1) for maintaining the temperature of the workpiece at the carburizing temperature. Upon completion of the carburization, the workpieces are loaded onto the transport unit 12 and are further transported from the carburizing chambers 5a to 5f to the intermediate camber 4 through the intermediate doors 3a to 3f, respectively. Incidentally, the supporting bases of the carburizing chambers 5a to 5f are electrically insulated from the chamber walls of the aforesaid carburizing chambers 5a to 5f, respectively.

The cooling chamber 6 is a vacuum-sealable chamber for cooling the workpiece, which is transported by the transport unit 12 from the intermediate chamber 4, to a temperature which is not higher than A1 transformation temperature, and has a double wall structure for the water-cooling of the walls thereof. Further, the cooling chamber 6 has a supporting base (not shown) for supporting a workpiece in upwardly and downwardly movable manner, and a cooling fan (not shown) for cooling a workpiece, which are provided therein. Upon completion of the cooling, the workpiece is loaded onto the transport unit 12 and is then transported to the intermediate chamber 4 from the cooling chamber 6 through the intermediate door 3h.

The reheating chamber 7 is a vacuum sealable chamber for quickly heating the workpiece, which is transported from the intermediate chamber 4 by the transport unit 12, to a quenching temperature upon completion of the cooling thereof. Further, the reheating chamber 7 has a double wall structure for the water-cooling of the walls thereof. Moreover, the reheating chamber 7 further has a supporting base (not shown) for supporting a workpiece in upwardly and downwardly movable manner, and an induction heating coil (not shown) for reheating a workpiece, which are provided therein. Upon completion of the reheating, the workpiece is loaded onto the transport unit 12 and is then transported to the intermediate chamber 4 from the reheating chamber 7 through the intermediate door 3i.

The quenching chamber 8 is a vacuum sealable chamber for quenching the workpiece, which is transported from the intermediate chamber 4 by the transport unit 12, upon completion of the reheating thereof. Further, the quenching chamber 8 has a supporting base 15c for supporting a workpiece in an upwardly and downwardly movable manner, which is provided therein. Upon completion of the quenching, the workpiece is loaded onto the transport unit 13 and is then transported to the tempering chamber 10 from the quenching chamber 8 through the exit door 9.

The tempering chamber 10 is a chamber for tempering the workpiece transported by the transport unit 13 and is provided with a supporting base 16, on which the workpiece is set, and a heating unit for heating the workpiece to a tempering temperature. Tempering is performed in the atmosphere (namely, in the air). Thus, similarly as in the case of this embodiment, the tempering chamber 10 is configured in such a manner as to be opened to the atmosphere and is not allowed to take the form of an enclosure. Upon completion of the tempering, the workpiece is loaded onto the transport unit 13 and is further transported to the machining shop for performing the next step.

Thus, the aforementioned apparatus for carburizing, quenching and tempering according to this embodiment of the present invention has the configuration in which the preheating chamber 2, the carburizing chambers 5a to 5f, the cooling chamber 6, the reheating chamber 7 and the quenching chamber 8, each of which is a vacuum sealable chamber, are connected through the intermediate doors 3a to 3j with one another and are placed around the intermediate chamber 4.

Hereinafter, an operation of the apparatus for carburizing, quenching and tempering the workpieces, which has such a configuration, will be described in detail by referring to FIG. 3.

Figure 3:
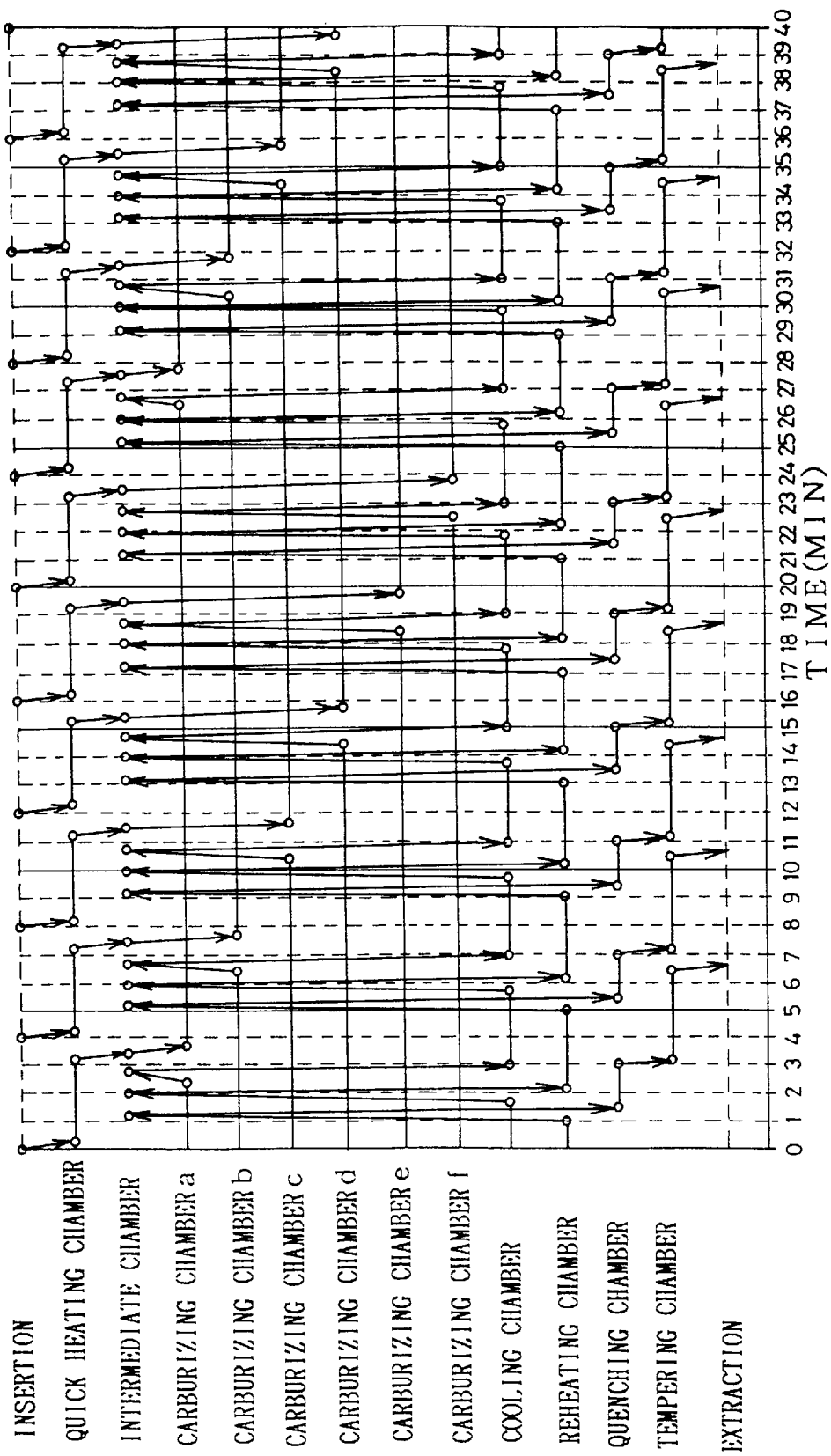
FIG. 3 is a time chart illustrating a method for carburizing, quenching and tempering workpieces in the apparatus embodying the present invention, namely, "Embodiment 1" of the present invention.

In the case of the time chart of FIG. 3, it is assumed that the machining time per workpiece is 4 minutes and that the carburizing time at a temperature of 1100 degrees centigrade is 22 minutes and 45 seconds, on the supposition that the effective case depth required of the workpiece is 0.5 to 0.8 mm.

First, after machining oil having adhered to one or more workpieces, which are machined by the machining apparatus, is cleaned, the workpieces are carried into the preheating chamber 2 through the entrance door 1 by the transport unit 11 (at time 0).

The workpiece carried thereinto is set at the supporting base 14g. Then, this workpiece is raised (or elevated) by the supporting base 14g up to a predetermined position where the workpiece is preheated. Subsequently, the entrance door 1 is closed. Further, air and gases are removed from the preheating chamber 2 by vacuum-pumping till the internal pressure of the preheating chamber 2 becomes 1 Pa or so (namely, reaches a pressure which is small to the extent that the workpiece does not undergo oxidation at the carburizing temperature). Then, the workpiece is quickly heated by an induction (magnetic) field which is caused by passing a high-frequency electric current, whose frequency is equal to or higher than 0.5 Hz but is equal to or less than 3 kHz, through the induction heating coil 17. When the temperature of the workpiece reaches the carburizing temperature which is not lower than the A1 transformation point (or temperature), the workpiece is maintained at this carburizing temperature until the processing to be performed in the next step is commenced. If the intermediate chamber 4 and the carburizing chamber (namely, one of the chambers 5a to 5f) are empty, the passage of the high-frequency electric current is stopped. Then, the intermediate door 3g is opened. Thus, the workpiece is transported to the intermediate chamber 4 by the transport unit 12 through the intermediate door 3g (at time 3.25 (min.)).

From the intermediate chamber 4, air and gases are exhausted until the (internal) pressure thereof becomes 1 Pa or so (namely, reaches a pressure which is small to the extent that the workpiece does not undergo oxidation). The workpieces transported from the preheating chamber 2 by the transport unit 12 are carried into the corresponding one of the carburizing chambers 5a to 5f through the corresponding one of the intermediate doors 3a to 3f. Here, it is assumed that the workpiece is charged into the carburizing chamber 5a (at time 3.75 (min.)). At that time, another workpiece having been machined by the machining apparatus is simultaneously carried into the preheating chamber 2 through the entrance door 1 after cleaned. In this way, the workpieces are carried into the preheating chamber 2 from the machining apparatus with no waiting (or wait) time (namely, a waiting time is 0) by controlling the carrying timing according to the machining time.

From the carburizing chamber 5a, air and gases are exhausted until the (internal) pressure thereof becomes 1 Pa or so (namely, reaches a pressure which is small to the extent that the workpiece does not undergo oxidation). The workpiece transported from the intermediate chamber 4 is set on the supporting base (not shown). Then, this supporting base is raised to the predetermined position where the workpiece is carburized. Further, the intermediate door 3a is closed. Subsequently, the workpiece is maintained at the carburizing temperature by an induction (magnetic) field by passing a high-frequency electric current, whose frequency is equal to or higher than 0.5 kHz but is equal to or less than 3 kHz, through the induction heating coil (not shown). At that time, a carrier gas is introduced into the carburizing chamber 5a through a gas manifold (not shown). Here, note that the carrier gas is a carbon containing gas, for instance, a single-substance gas of hydrocarbon, such as $C_3H_8$, alternatively, a mixed gas containing gaseous hydrocarbon and one or two kinds of inert gases, such as Ar, and gaseous hydrogen ($H_2$). The carrier gas is injected into the carburizing chamber 5a at a predetermined flow rate. Thereafter, when the (internal) pressure of the carburizing chamber 5a reaches the predetermined pressure (approximately in the $1 \times 10^1$- to $2.6 \times 10^3$-Pa range) by controlling amounts of air and gases exhausted therefrom), a d.c. current or a pulse d.c. current is passed therethrough by employing the wall of the carburizing chamber 5a as an anode, and employing the supporting base (not shown) as a cathode. Further, a voltage, by which a glow discharge can be caused, is applied thereacross. Upon completion of the carburization, the introduction of the carrier gas, the passage of the glow-discharge electric current and the passage of the high-frequency current through the induction heating coil (not shown) are stopped. Then, air and gasses are exhausted from the carburizing chamber by vacuum-pumping until the internal pressure of the carburizing chamber is reduced to a predetermined pressure which is in the 1-Pa range. Subsequently, the intermediate door 3a is opened. Further, the transport unit 12 is inserted into the carburizing chamber 5a. Then, the supporting base is lowered. Thus, the workpiece is transported by the transport unit 12 into the intermediate chamber 4 through the intermediate door 3a (at time 26.5 (min.)).

From the intermediate chamber 4, air and gases are exhausted by vacuum-pumping until the (internal) pressure thereof becomes 1 Pa or so (namely, reaches the pressure which is small to the extent that the workpiece does not undergo oxidation). The workpiece transported by the transport unit 12 from the carburizing chamber 5a is carried into the cooling chamber 6 through the intermediate door 3h and is then set (at time 27 (min.)) on the supporting base (not shown).

From the cooling chamber 6, air and gases are exhausted by vacuum-pumping until the (internal) pressure thereof becomes 1 Pa or so (namely, reaches the pressure which is small to the extent that the workpiece does not undergo oxidation). Then, the workpiece is put on the supporting base in the cooling chamber 6. When the intermediate door 3h is closed, the internal pressure of the cooling chamber 6 is increased to a pressure, which is not lower than a atmospheric pressure, by using inert gases such as N2 gas. Subsequently, the cooling fan (not shown) provided in the cooling chamber 6 is activated, so that the inert gas encapsulated in the cooling chamber 6 circulates therethrough. Heat is then exchanged between the workpiece and the wall of the double wall structure, which is cooled by water, of the cooling chamber 6 through the inert gas. Thus, the workpiece is cooled to a temperature which is not higher than A1 transformation temperature. Upon completion of the cooling, the cooling fan is stopped and air and gasses are removed by vacuum-pumping until the internal pressure of the cooling chamber 6 becomes a predetermined pressure of 1 Pa or so (namely, reaches the pressure which is small to the extent that the workpiece does not undergo oxidation). Subsequently, the intermediate door 3h is opened. Then, the transport unit 12 is inserted (or loaded) into the cooling chamber 6. Further, the supporting base is lowered. Thus, the workpiece is transported to the intermediate chamber 4 through the intermediate door 3h (at time 29.75 (min.)).

Then, air and gases are exhausted from the intermediate chamber 4 by vacuum-pumping until the (internal) pressure thereof becomes 1 Pa or so (namely, reaches the pressure which is small to the extent that the workpiece does not undergo oxidation). The workpiece transported by the transport unit 12 from the cooling chamber 6 is carried into the reheating chamber 7 through the intermediate door 3i and is then set (at time 30.25 (min.)) on the supporting base (not shown) provided in the chamber 7.

From the reheating chamber 7, air and gases are removed by vacuum-pumping till the internal pressure of the reheating chamber 7 becomes 1 Pa or so (namely, reaches a pressure which is small to the extent that the workpiece does not undergo oxidation). Then, the workpiece is quickly heated by an induction (magnetic) field which is caused by passing a high-frequency electric current, whose frequency is equal to or higher than 0.5 kHz but is equal to or less than 3 kHz, through the induction heating coil 19. When the temperature of the workpiece reaches the quenching temperature which is not lower than the A1 transformation point (or temperature), the workpiece is maintained at this quenching temperature until the processing to be performed in the next step is commenced. When the maintaining of the quenching temperature is finished and further, the passage of the high-frequency electric current through the induction heating coil (not shown) is stopped, and then, the intermediate door 3i is opened, the workpiece is taken out therefrom to the intermediate chamber 4 by the transport unit 12 through the intermediate door 3i (at time 33 (min.)).

Then, air and gases are exhausted from the intermediate chamber 4 by vacuum-pumping until the (internal) pressure thereof becomes 1 Pa or so (namely, reaches the pressure which is small to the extent that the workpiece does not undergo oxidation at the quenching temperature). The workpiece transported by the transport unit 12 from the reheating chamber 7 is carried into the quenching chamber 8 through the intermediate door 3j and is then set (at time 33.5 (min.)) on the supporting base 15c provided in the chamber 8.

From the quenching chamber 8, air and gases are exhausted by vacuum-pumping until the (internal) pressure thereof is in the 1 Pa range (namely, reaches the pressure which is small to the extent that the workpiece does not undergo oxidation at the quenching temperature). When the supporting base 15c, on which the workpiece is put on, is set on a predetermined place, the intermediate door 3j is closed and the quenching of the workpiece is performed. When performing the quenching, one kind of oil, water and gasses (including a liquefied gas) is employed as the refrigerant in atmospheres of inert gases such as $N_2$ gas under a reduced pressure or under an atmospheric pressure. For example, in the case of the quenching by using the gas as illustrated in this figure, the quenching chamber 8 is filled with the inert gases such as $N_2$ gas and He gas, at a pressure which is not lower than an atmospheric pressure. Subsequently, the cooling fan 21 provided in the quenching chamber 8 is activated, so that the inert gas encapsulated in the quenching chamber 8 circulates therethrough. Heat is then exchanged between the workpiece and the wall of the double wall structure, which is cooled by water, of the quenching chamber 8 through the inert gas. Thus, the workpiece is quickly cooled and quenched. Incidentally, a single-substance gas of $H_2$, alternatively, a mixed gas containing gaseous hydrogen $H_2$ and one or two kinds of inert gases may be used as the refrigerant gas, instead of a mixed gas containing one or two kinds of inert gases. Upon completion of the cooling, the cooling fan 21 is stopped and the refrigerant gas is released or emitted to the outside quenching chamber 8 until the internal pressure thereof becomes equal to the atmospheric pressure. Subsequently, the exit door 9 is opened. Then, the transport unit 13 is inserted (or loaded) into the quenching chamber 8. Further, the supporting base 15c is lowered. Thus, the workpiece is transported to the outside of the quenching chamber 8 through the exit door 13 (at time 35 (min.)).

In the tempering chamber 10, the tempering is performed in the atmosphere (namely, in the ambient air). Thus, in the case of this embodiment, the tempering chamber 10 does not take the form of an enclosure but is opened to the atmosphere. The workpiece set on the supporting base 16 by the transport unit 13 is quickly heated to a preset tempering temperature (in the range between 150 and 250 degrees centigrade) according to an induction heating (method), a direct energization heating (method) or a far infrared radiation heating (method). Further, the workpiece is maintained at the tempering temperature for a time period having a predetermined length. Thereby, the tempering of the workpiece is performed. Thereafter, upon completion of the tempering of the workpiece, the workpiece is put on the transport unit 13 and is subsequently transported to the machining apparatus for carrying out processing to be performed in the next step.

As described above, this embodiment of the present invention is provided with six carburizing chambers. Further, this embodiment is adapted so that the carburization of workpieces is performed by serially distributing the workpieces to the carburizing chambers. Thus, the process consisting of steps of carburizing, quenching and tempering workpieces is performed on the same line as a line on which the machining is performed by the machining apparatus. Thereby, the transport, set-up and disassembling of workpieces are unnecessary. Moreover, it is unnecessary to stock workpieces. Furthermore, in accordance with this embodiment, the initiation and termination of the manufacturing of products can be achieved by turning on and off a switch provided in the apparatus, respectively. Additionally, there is no necessity of the around-the-clock operation, differently from the conventional apparatus. Besides, in the case of this embodiment, one workpiece or a small number of workpieces can be serially processed or treated. As a result of serially processing the workpieces one by one, variation in quality among heated workpieces can be reduced exceedingly, in comparison with a method by which a large number of workpieces should be processed at a time, similarly as in the case of the conventional batch system.

Figure 4:
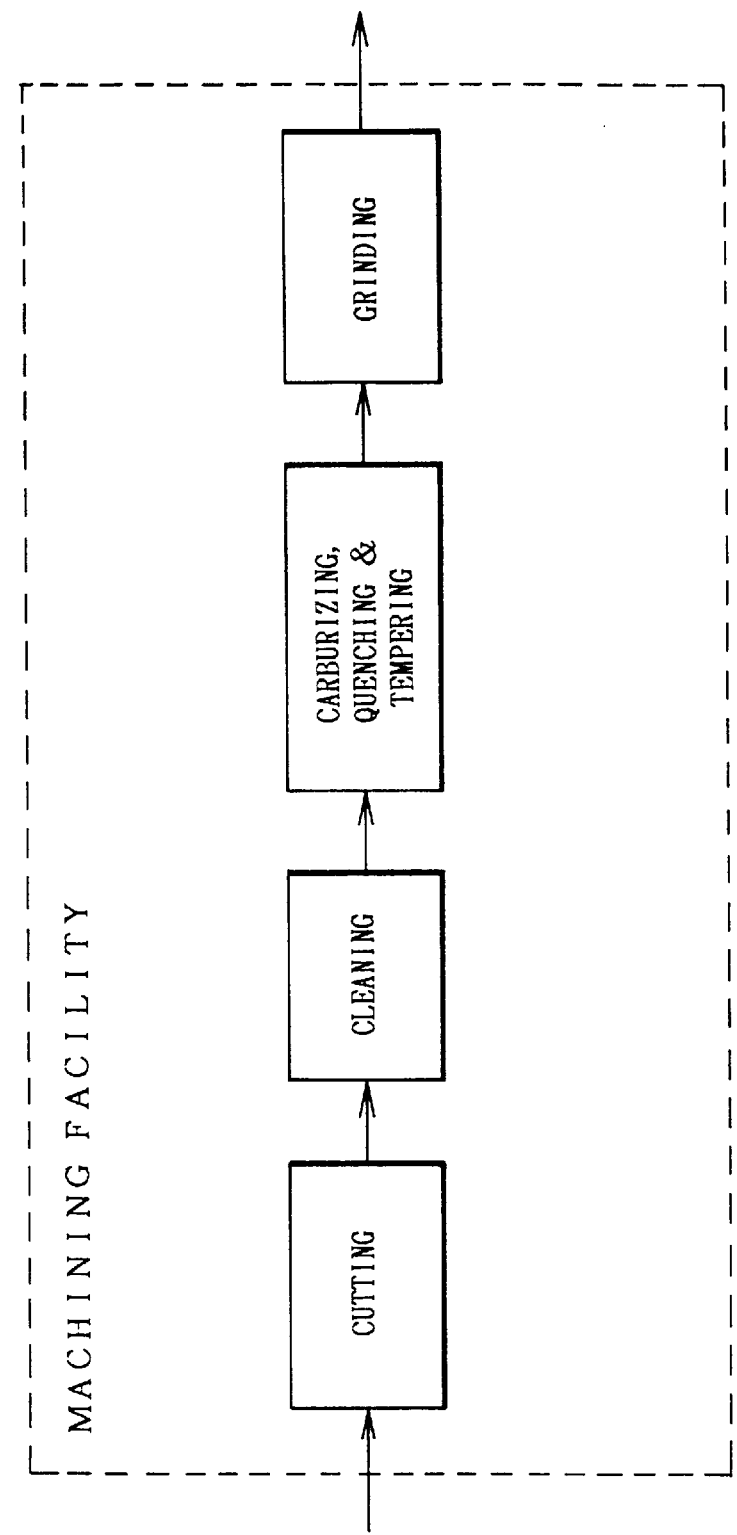
FIG. 4 is a block diagram illustrating steps of the method for carburizing, quenching and tempering workpieces in "Embodiment 1" and "Embodiment 2" of the present invention.
Figure 10:
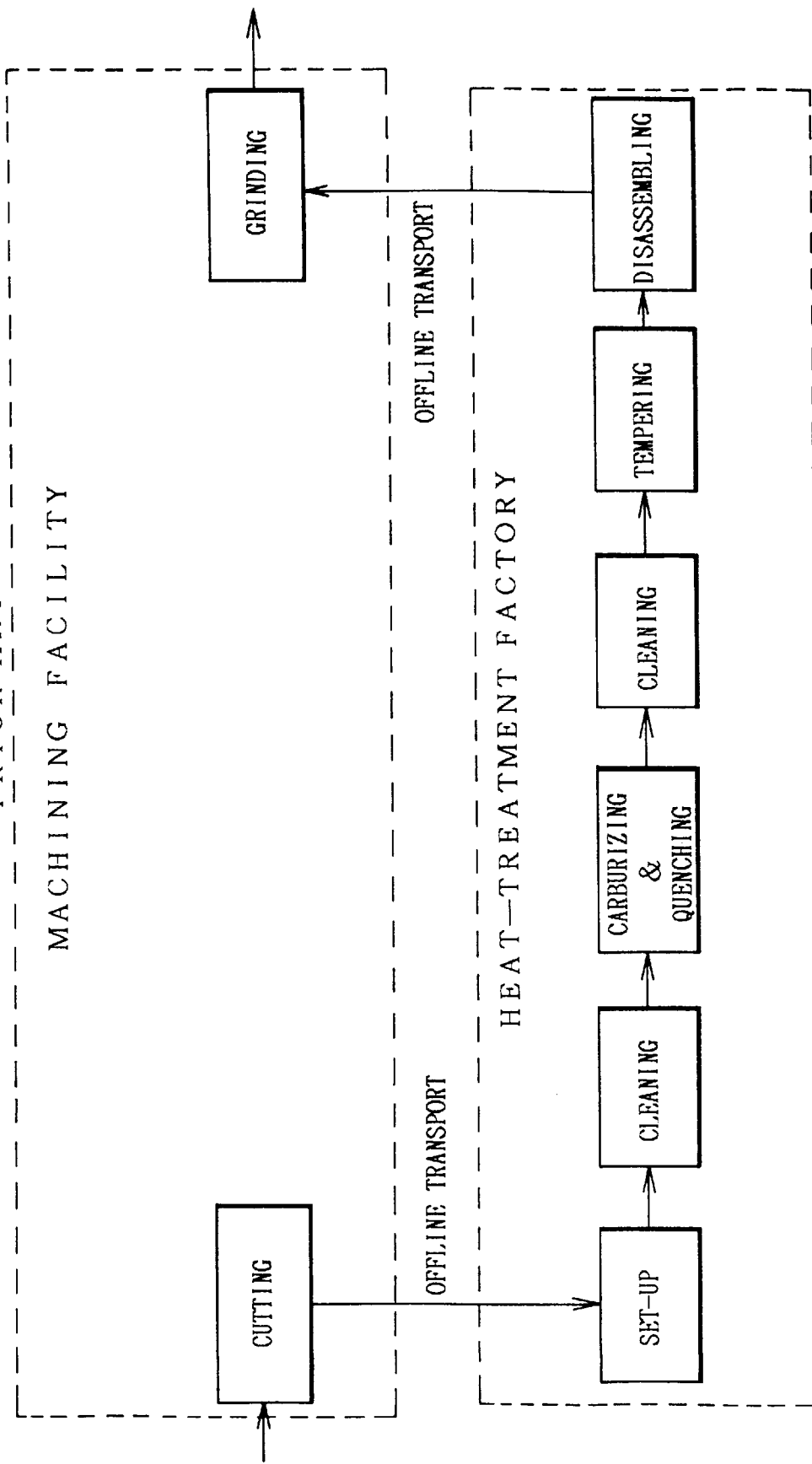
FIG. 10 is a block diagram illustrating the steps of the conventional method for carburizing, quenching and tempering workpieces.

Besides, as is seen (or understood) from FIG. 4, the method for carburizing, quenching and tempering workpieces, which consisting of the steps illustrated in this figure, is considerably simplified, in comparison with the steps of the conventional method illustrated in FIG. 10.

Figure 5:
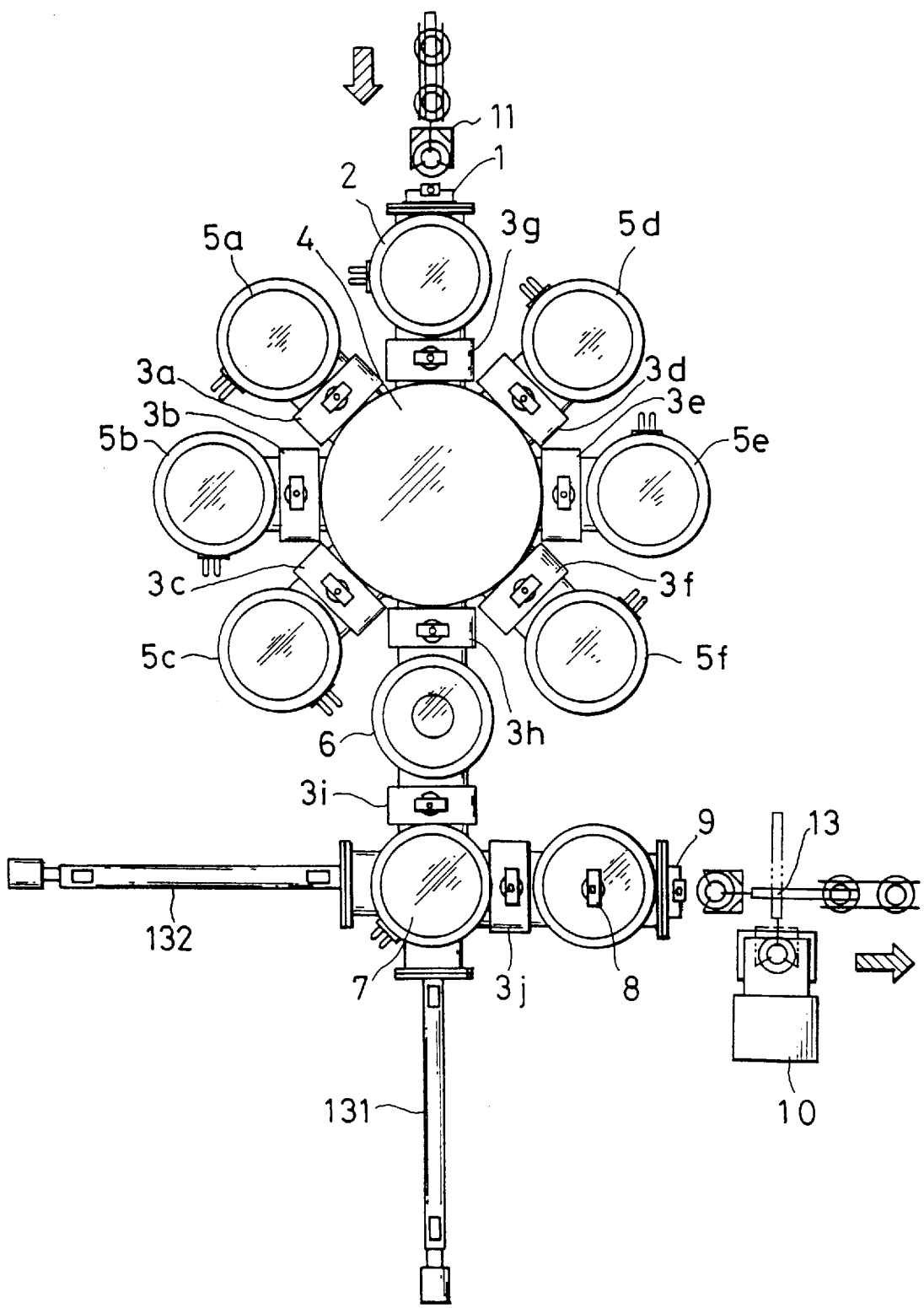
FIG. 5 is a schematic longitudinal sectional view of another apparatus for carburizing, quenching and tempering workpieces, which is an example of a modification of "Embodiment 1" of the present invention.

Further, the aforementioned embodiment has a configuration in which the preheating chamber, the carburizing chambers, the cooling chamber, the preheating chamber and the quenching chamber are connected with one another and placed around the intermediate chambers. However, as illustrated in the schematic plan diagram of FIG. 5, the following configuration may be adopted. Namely, the preheating chamber 2, the carburizing chambers 5a to 5f and the cooling chamber 6 are connected with one another around the intermediate chamber 4. Further, the reheating chamber 7 is connected to the cooling chamber 6. Moreover, the quenching chamber 8 is connected to the reheating chamber 7. Incidentally, in this case, a transport unit 131 for transporting a workpiece, which has been placed in the cooling chamber 6, to the reheating chamber 7, and a transport unit 132 for transporting a workpiece, which has been placed in the reheating chamber 7, to the quenching chamber 8 are provided in the apparatus.

Figure 6:
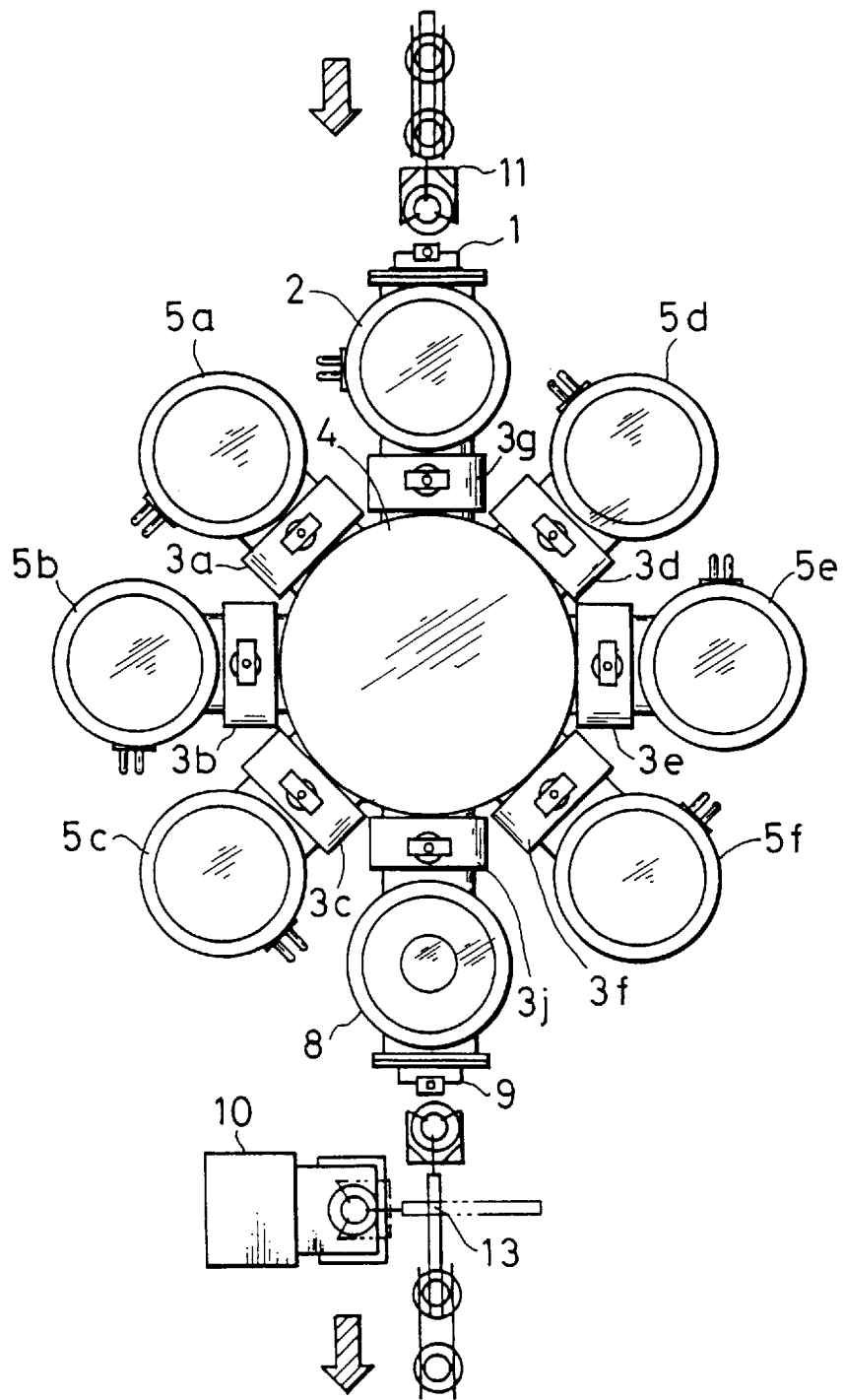
FIG. 6 is a schematic plan view of this apparatus for carburizing, quenching and tempering workpieces, namely, the example of the modification of "Embodiment 1" of the present invention.

Additionally, in the case of the aforementioned embodiment, the cooling chamber 6 and the reheating chamber 7 are provided in the apparatus so as to fine or reduce the grain size (number) of a workpiece. However, in the case of treating workpieces at a lower temperature at which the grain size thereof is not increased (namely, the workpieces cannot be coarsened), the cooling chamber 6 and the reheating chamber 7 may be removed from the apparatus as illustrated in the schematic plan diagram of FIG. 6.

Embodiment 2

Figure 8:
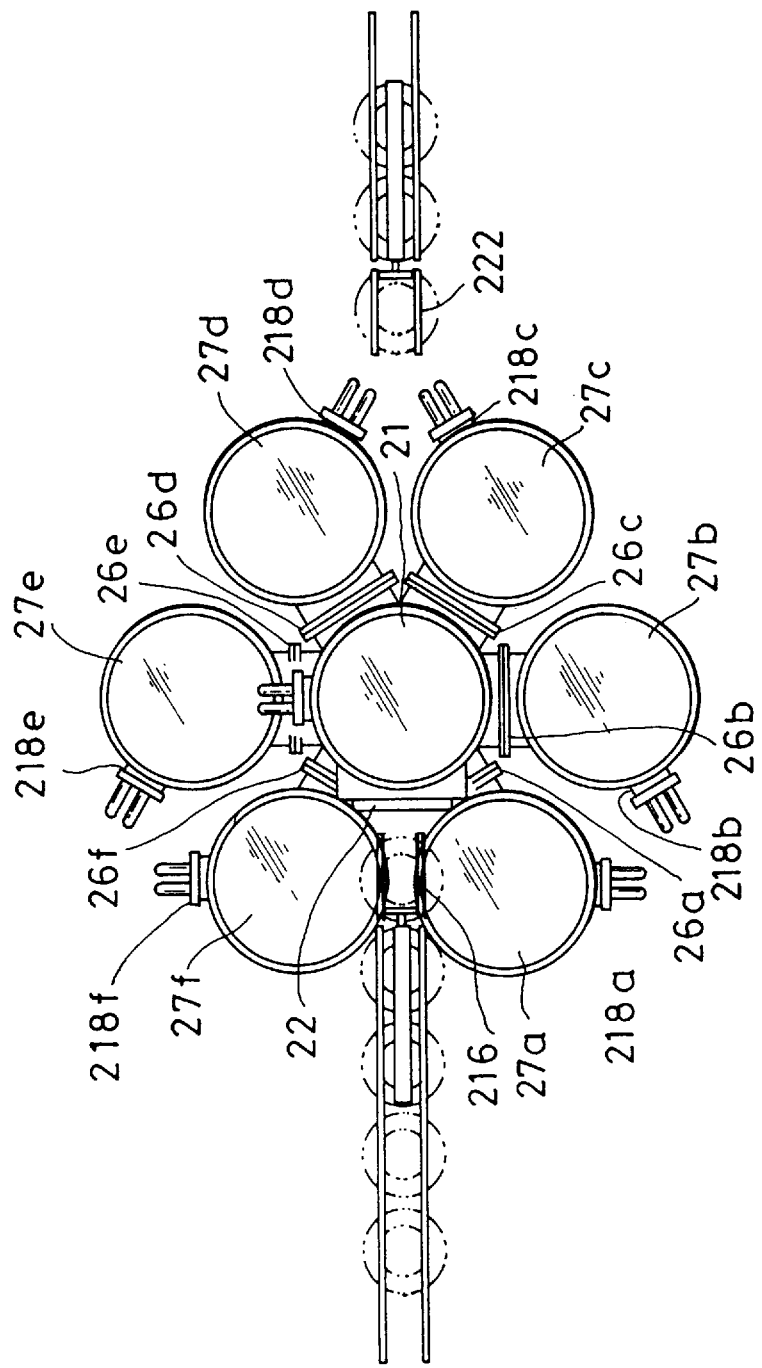
FIG. 8 is a schematic plan view of this apparatus for carburizing, quenching and tempering workpieces, namely, "Embodiment 2" of the present invention.

FIG. 7 illustrates a schematic longitudinal sectional view of another apparatus for carburizing, quenching and tempering workpieces, which is a second embodiment ("Embodiment 2") of the present invention. FIG. 8 is a schematic plan view of this apparatus. Differently from "Embodiment 1" in which the preheating chamber, the carburizing chambers, the intermediate chambers and the quenching chamber and so forth are placed nearly on a same plane, this "Embodiment 2" is an example of the apparatus, in which such chambers are arranged as a plurality of stages placed in a vertical (namely, upward or downward) direction.

The apparatus for carburizing, quenching and tempering workpieces, which is this embodiment of the present invention, is provided with a preheating chamber 22, an intermediate chamber 24, carburizing chambers 27a to 27f, a quenching chamber 211 and a tempering chamber 214. In the vicinity of the preheating chamber 22, there is provided an entrance door 21 through which workpieces to be treated (or processed) are carried into the preheating chamber 22. Further, an intermediate door 25 is provided in a coupling portion between the preheating chamber 22 and the intermediate chamber 24. Further, each of intermediate doors 26a to 26f is provided in a coupling (or joint) portion between the preheating chamber 24 and a corresponding one of carburizing chambers 27a to 27f placed therearound. Moreover, intermediate doors 210 and 213 are provided in a coupling portion between the intermediate chamber 24 and the quenching chamber 211 provided thereunder, and a coupling portion between the quenching chamber 211 and the tempering chamber 214, respectively. Furthermore, an exit door 215, through which workpieces are carried out of the tempering chamber 214, is provided therein. In addition, although an induction heating coil for performing high-frequency induction heating is provided in each of the preheating chamber 22, the carburizing chambers 27a to 27f, and the tempering chamber 214, only the induction heating coils 23, 28a and 214a, which are provided in the preheating chamber 22, the carburizing chamber 27a and the tempering chamber 214, respectively, are shown in FIG. 7 and the illustration of the other induction heating coils is omitted therein, for simplicity of drawing. Besides, transport units 217 and 219, which further serve as supporting bases each for supporting workpieces, are provided in the preheating chamber 22 and the quenching chamber 211, respectively. Although a supporting base for supporting the workpiece in upwardly and downwardly movable manner is provided in each of the carburizing chambers 27a to 27f and the tempering chamber 214, only a supporting base 29a provided in the carburizing chamber 27a and another supporting base 221 provided in the tempering chamber 214 are shown in FIG. 7 and the illustration of the other supporting bases is omitted. Further, a transport fork 216 for carrying workpieces into the preheating chamber 22 through the entrance door 21 is provided in the vicinity of the preheating chamber 22. Further, transport forks 218a to 218f, each of which is used for taking in workpieces to and taking out workpieces from a corresponding one of transport units 217 and 219 in the intermediate chamber 24, are provided in the carburizing chambers 27a to 27f. Moreover, a transport fork 220 for transporting workpieces to the tempering chamber 214 is provided with the quenching chamber 211. Furthermore, a transport fork 222 for carrying out workpieces from the tempering chamber 214 is provided in the proximity of the exit door 215. Incidentally, the drawing of a vacuum pumping system, a gas injection (or introduction) system and a power supply system is omitted.

The preheating chamber 22 is a vacuum-sealable chamber used to receive workpieces, which have been machined by a machining apparatus (not shown) and transported by the transport fork 216, through the entrance door 21 and to rapidly heat the received workpieces to the carburizing temperature. Further, the preheating chamber 22 has a double wall structure for the water-cooling of the walls thereof and is provided with the transport unit 217 for supporting and transporting workpieces to the intermediate chamber 24, and the induction heating coil 23 for preheating the workpiece are provided therein. As will be described later, the preheated workpiece is conveyed to the intermediate chamber 24 through the intermediate door 25.

The intermediate chamber 24 is a vacuum-sealable chamber that is needed as a relay chamber when transporting workpieces from the preheating chamber 22 to the carburizing chambers 27a to 27f or when each of the carburizing chambers to the quenching chamber 211. Further, the intermediate chamber 24 receives the preheated workpieces through the intermediate door 25 and serially transports the workpieces to the carburizing chambers 27a to 27f through the intermediate doors 26a to 26f by putting the workpieces on the transport forks 218a and so on (incidentally, the drawing of the transport forks corresponding to the carburizing chambers 27b to 27f), respectively. As will be described later, the intermediate chamber 24 receives the workpieces, which are conveyed from the carburizing chambers 27a to 27f through the intermediate doors 26a to 26f, respectively, and have been carburized. Further, the intermediate chamber 24 is adapted to put the workpieces on the transport unit 219 and carry the workpieces into the quenching chamber 211 through the intermediate door 210.

The carburizing chambers 27a to 27f are vacuum-sealable chambers for carburizing the workpieces transported thereto by the transport fork 218a and so forth, respectively. Further, these carburizing chambers have double wall structures for the watercooling of the walls thereof. Moreover, each of the carburizing chambers is provided with a corresponding one of the supporting bases 29a and so forth, which is adapted to support the workpieces in an upwardly and downwardly movable manner (incidentally, in FIG. 7, the drawing of the supporting bases corresponding to the carburizing chambers 27b to 27f is omitted), and a corresponding one of the induction heating coils 28a and so on (incidentally, the drawing of induction heating coils corresponding to the carburizing chambers 27b to 27f is omitted in FIG. 7) for maintaining the temperature of the workpiece at the carburizing temperature. Upon completion of the carburization, the workpieces are loaded onto the transport forks and are further transported from the carburizing chambers 27a to 27f to the intermediate camber 24 through the intermediate doors 26a to 26f, respectively. Incidentally, the supporting bases of the carburizing chambers 27a to 27f are electrically insulated from the chamber walls of the aforesaid carburizing chambers 27a to 27f, respectively.

The quenching chamber 211 is a vacuum sealable chamber for quenching the workpiece, which is transported by the transport fork 219 that is provided therein and further serves as a supporting base for supporting the workpiece. Further, the quenching chamber 8 has a nozzle 212 for cooling the workpiece therein. Upon completion of the quenching, the workpiece is loaded onto the transport fork 220 and is then transported to the tempering chamber 214 from the quenching chamber 211 through the intermediate door 213.

The tempering chamber 214 is a vacuum sealable chamber for tempering the workpiece transported by the transport fork 220 and is provided with a supporting base 221 for supporting a workpiece in an upwardly and downwardly movable manner, and with an induction heating coil 214a for heating the workpiece. Upon completion of the tempering, the workpiece is loaded onto the transport unit 222 and is further transported to the machining shop for performing the next step through the exit door 215.

Thus, the aforementioned apparatus for carburizing, quenching and tempering according to this embodiment of the present invention has the configuration, wherein the preheating chamber 22, the carburizing chambers 27a to 27f, the quenching chamber 211 and the tempering chamber 214, which are vacuum sealable chambers, are connected through the intermediate doors 25, 26a to 26f, 210 and 213 with one another, and wherein the intermediate chamber 24 is placed just under the preheating chamber 21 and further, the quenching chamber 211 is placed just under the intermediate chamber 24. Moreover, the six carburizing chambers 27a to 27f are placed around the intermediate chamber 24 substantially at a same height as of the intermediate chamber 24. Furthermore, the tempering chamber 214 is placed nearly at a same height as of the quenching chamber 211.

Hereinafter, an operation of the apparatus for carburizing, quenching and tempering the workpieces, which has such a configuration, will be described in detail by referring to a time chart of FIG. 9.

In the case of the time chart of FIG. 9, it is assumed that the machining time per workpiece is 3 minutes and that the carburizing time at a temperature of 950 degrees centigrade is 15 minutes, on the supposition that the effective case depth required of each workpiece is 0.3 to 0.5 mm.

First, after machining oil having adhered to workpieces, which are machined by the machining apparatus, is cleaned, the workpieces are carried into the preheating chamber 22 through the entrance door 21 by the transport fork 216 (at time 0).

The workpiece carried thereinto is set at the transport unit 217 that further serves as a supporting base. Then, this workpiece is raised (or elevated) by the transport unit 217 up to a predetermined position where the workpiece is preheated. Subsequently, the entrance door 21 is closed. Further, air and gases are removed from the preheating chamber 22 by vacuum-pumping till the internal pressure of the preheating chamber 22 becomes 1 Pa or so (namely, reaches a pressure which is small to the extent that the workpiece does not undergo oxidation). Then, the workpiece is quickly heated by an induction (magnetic) field which is caused by passing a high-frequency electric current, whose frequency is equal to or higher than 0.5 kHz but is equal to or less than 3 kHz, through the induction heating coil 23. When the temperature of the workpiece reaches the carburizing temperature which is not lower than the A1 transformation point (or temperature), the workpiece is maintained at this carburizing temperature until the processing to be performed in the next step is commenced. If the intermediate chamber 24 and the carburizing chamber (namely, one of the chambers 27a to 27f) are empty, the passage of the high-frequency electric current is stopped. Then, the transport unit 217 is lowered. Thus, the workpiece is transported to the intermediate chamber 24 through the intermediate door 25.

From the intermediate chamber 24, air and gases are exhausted until the (internal) pressure thereof becomes 1 Pa or so (namely, reaches a pressure which is small to the extent that the workpiece does not undergo oxidation). The workpieces transported from the preheating chamber 22 are carried into the corresponding one of the carburizing chambers 27a to 27f by the transport forks 218a to 218f through the corresponding one of the intermediate doors 26a to 26f. Here, it is assumed that the workpiece is charged into the carburizing chamber 27a (at time 3 (min.)). At that time, another workpiece having been machined by the machining apparatus is simultaneously carried into the preheating chamber 22 through the entrance door 21 after cleaned. In this way, the workpieces are carried into the preheating chamber 22 from the machining apparatus with no waiting (or wait) time (namely, a waiting time is 0) by controlling the carrying timing according to the machining time.

From the carburizing chamber 27a, air and gases are exhausted until the (internal) pressure thereof becomes 1 Pa or so (namely, reaches a pressure which is small to the extent that the workpiece does not undergo oxidation). The workpiece transported from the intermediate chamber 24 is set on the supporting base 29a. Then, the workpiece is raised by the supporting base 29a to the predetermined position where the workpiece is carburized. Subsequently, the workpiece is maintained at the carburizing temperature by an induction (magnetic) field by passing a high-frequency electric current, whose frequency is equal to or higher than 0.5 kHz but is equal to or less than 3 kHz, through the induction heating coil 28a. Simultaneously with this, the intermediate door 26a is closed. At that time, a carrier gas is introduced into the carburizing chamber 27a through a gas manifold (not shown). Here, note that the carrier gas is a carbon containing gas, for instance, a single-substance gas of hydrocarbon, such as $C_3H_8$, alternatively, a mixed gas containing gaseous hydrocarbon and one or two kinds of inert gases, such as Ar, and gaseous hydrogen ($H_2$). The carrier gas is injected into the carburizing chamber 27a at a predetermined flow rate. Thereafter, when the (internal) pressure of the carburizing chamber 27a reaches the predetermined pressure (approximately in the $1 \times 10^1$- to $2.6 \times 10^3$-Pa range) by controlling amounts of air and gases exhausted therefrom), a d.c. current or a pulse d.c. current is passed therethrough by employing the wall of the carburizing chamber 27a as an anode, and employing the supporting base 29a as a cathode. Further, a voltage, by which a glow discharge can be caused, is applied thereacross. Upon completion of the carburization, the introduction of the carrier gas, the passage of the glow-discharge electric current and the passage of the high-frequency current through the induction heating coil (not shown) are stopped. Then, air and gasses are exhausted from the carburizing chamber 27a by vacuum-pumping until the internal pressure of the carburizing chamber is reduced to 1-Pa or so, which is a preset pressure. Subsequently, the intermediate door 26a is opened. Further, the passage of the high-frequency current to the induction heating coil 28a is stopped. Then, the supporting base 29a is lowered. Thus, the workpiece is transported by the transport fork 218a into the intermediate chamber 24 through the intermediate door 26a.

From the intermediate chamber 24, air and gases are exhausted by vacuum-pumping until the (internal) pressure thereof becomes 1 Pa or so (namely, reaches the pressure which is small to the extent that the workpiece does not undergo oxidation). The workpiece transported from the carburizing chamber 27a is put on the transport unit 219 having been raised from the quenching chamber 211. As a result of lowering the transport unit 219, the workpiece put thereon is carried into the quenching chamber 211 through the intermediate door 210.

From the quenching chamber 211, air and gases are exhausted by vacuum-pumping until the (internal) pressure thereof becomes 1 Pa or so (namely, reaches the pressure which is small to the extent that the workpiece does not undergo oxidation at the quenching temperature). When the workpiece put on the transport unit 219, which further serves as a supporting base, is rapidly cooled by a refrigerant sprayed by the nozzle 212 placed in such a manner as to uniformly envelope the workpiece. Thereby, the workpiece is quenched. At that time, the quenching of the workpiece is performed in atmospheres of inert gases such as $N_2$ gas under a reduced pressure or under an atmospheric pressure. Further, one of oil, water and gasses (including a liquefied gas) is employed as the refrigerant. After the quenching of the workpiece is finished, the supporting base 219 descends and the workpiece is put on the transport fork 220. Then, the workpiece is transported to the tempering chamber 214 through the intermediate door 213.

When reaching the tempering chamber 214, the workpiece is set on the supporting base 221. Subsequently, the supporting base 221 is raised to the predetermined position where the workpiece is heated. Then, the tempering of the workpiece is performed. At that time, the tempering thereof is performed by quickly heating the workpiece up to a preset tempering temperature (150 to 250 degrees centigrade) by the use of an induction heating coil 214a (incidentally, a direct energization heating (method) or a far infrared radiation heating (method) may be employed, instead of this coil) under a reduced pressure or under an atmospheric pressure and by further maintaining the workpiece at the tempering temperature for a time period having a predetermined length. Thereafter, upon completion of the tempering of the workpiece, the supporting base 221, on which the workpiece is put, moves down. Then, the workpiece is put on the transport fork 222 and is subsequently transported through the exit door 215 to the machining apparatus for carrying out processing to be performed in the next step.

As described above, this embodiment (namely, "Embodiment 2") of the present invention has advantages similar to those of "Embodiment 1". In addition, in the case of Embodiment 2, the transport unit is provided correspondingly to almost all of the chambers, respectively, so that a quick transport can be achieved. Therefore, as compared with the case of "Embodiment 1", the treating (or processing) tact time can be shortened in the case of "Embodiment 2".

Although the preferred embodiments of the present invention have been described above, it should be understood that the present invention is not limited thereto and that other modifications will be apparent to those skilled in the art without departing from the spirit of the invention. For example, in the case of each of the aforementioned embodiments of the present invention, the carburizing process is performed by inserting (or loading) into the carburizing chamber one by one. However, the carburizing process may be performed by simultaneously inserting a small number of workpieces into the carburizing chamber. Furthermore, although each of the aforementioned embodiments of the present invention is provided with six carburizing chambers, one quenching chamber, one reheating chamber and one tempering chamber, the number of the chambers of such kinds may be determined optionally or arbitrarily by taking into account the machining time required to machine a single workpiece.

The scope of the present invention, therefore, should be determined solely by the appended claims.

What is claimed is:

1. A method of carburizing, quenching and tempering workpieces, comprising:

a preheating step of preheating a workpiece, which is to be treated, to a carburizing temperature;

a carburizing step of carburizing said workpiece at the carburizing temperature after preheating said workpiece;

a quenching step of quenching said workpiece after carburizing said workpiece; and a tempering step for tempering said workpiece after quenching said workpiece, wherein said workpieces are supplied onto a machining and manufacturing line for machining and manufacturing a product, and wherein each of said steps is performed in accordance with a supplying speed, at which said workpieces are supplied onto said machining and manufacturing line, in such a manner that a flow of said workpieces on said machining and manufacturing line is substantially prevented from being stopped.

2. The method of carburizing, quenching and tempering workpieces, according to claim 1, wherein each of said steps is performed by providing treatment means of the number, which are necessary for performing each of said steps without substantially stopping a flow of said workpieces on said machining and manufacturing line, correspondingly to a time period, which is necessary for performing a corresponding one of said steps, and by setting one workpiece or a set of two workpieces more as a unit of treatment, as needed, and then distributing and supplying said workpieces in the units of treatment in sequence to said treatment means.

3. The method of carburizing, quenching and tempering workpieces, according to claim 1, wherein preheating means for performing said preheating step is configured separately from carburizing means for performing said carburizing step, wherein said preheating means employs a high frequency induction heating process to thereby establish a preheating time period in such a manner as to be sufficiently shorter than a time interval between supplies of the workpieces in the units of treatment through said machining and manufacturing line, wherein the number of said preheating means is set at one, and wherein the number of said carburizing means is set in such a manner as to meet the condition given by the following inequality:

$Z \geq X/Y$ where X denotes a time period taken for performing said carburizing step; Y the time interval between the supplies of the workpieces in the units of treatment through said machining and manufacturing line; and Z the number of said carburizing means for performing said carburizing step.

4. The method of carburizing, quenching and tempering workpieces, according to claim 3, wherein said carburizing means for performing said carburizing step comprises:

means for carburizing by a plasma carburizing method to be performed by causing a glow discharge between said carburizing means and the workpiece while maintaining the temperature of the workpiece at the carburizing temperature, to thereby reduce a starting time, which is taken to start performing said method of carburizing, quenching and tempering the workpieces, in such a manner as to become close to a start-up time, which is taken to cause said machining and manufacturing line to start working, so that performance of said method of carburizing, quenching and tempering the workpieces is started substantially in synchronization with the starting of an operation of said machining and manufacturing line and that the performance of said method of carburizing, quenching and tempering the workpieces is stopped near to the stopping of the operation of said machining and manufacturing line.

5. The method of carburizing, quenching and tempering workpieces, according to claim 4, wherein a high-frequency induction heating process is used as a process of maintaining the temperature of the workpiece at the carburizing temperature.

6. The method of carburizing, quenching and tempering workpieces, according to claim 3, wherein a high frequency used in said high-frequency induction heating process is set in such a way as to range from 0.5 kHz to 3 kHz.

7. The method of carburizing, quenching and tempering workpieces, as in claim 1 wherein said carburizing step is performed at a temperature, which is not lower than 950 degrees centigrade and is not higher than 1200 degrees centigrade, so as to reduce a length of a time period taken to accomplish said carburizing step, wherein a cooling step of cooling the workpieces to a temperature, which is not higher than A1 transformation temperature, and a reheating step of reheating the workpiece, which has been cooled in this cooling step, to a quenching temperature are added between said carburizing step and said quenching step.

8. The method of carburizing, quenching and tempering workpieces, according to claim 7, wherein said cooling means and said reheating means are provided in such a manner as to meet conditions given by the following inequalities:

$C \geq M/Y, H \geq N/Y$ where M designates a time taken to accomplish said cooling step of cooling the workpiece to a temperature which is not higher than said A1 transformation temperature; N a time taken to accomplish said reheating step of reheating the workpiece, which has been cooled in said cooling step, to the quenching temperature; Y the time interval between supplies of the workpieces in the units of treatment through said machining and manufacturing line; C the number of said cooling means for performing said cooling step; and H the number of said reheating means for performing said reheating step.

9. An apparatus for carburizing, quenching and tempering workpieces, comprising:

one or more preheating devices each for preheating a workpiece to a carburizing temperature;

one or more carburizing devices each for carburizing the workpiece at the carburizing temperature after preheating the workpieces;

one or more quenching devices each for quenching the workpiece after carburizing the workpiece;

one or more tempering devices each for tempering the workpiece after quenching the workpiece; and one or more transport devices each for performing an operation of setting one workpiece or a set of two workpieces or more as a unit of treatment, for carrying the workpieces into each of said devices and for performing an operation of carrying out the workpieces therefrom, said apparatus for carburizing, quenching and tempering workpieces being placed in a machining and manufacturing line for machining and manufacturing products, wherein each of a set of said preheating devices, a set of said carburizing devices, a set of said quenching devices and a set of said tempering devices, has said corresponding devices of the number, which are necessary for performing a corresponding one of said steps substantially without stopping a flow of the workpieces on a machining and manufacturing line, correspondingly to a time period, which is necessary for performing the corresponding one of said steps, and wherein a distributing unit for distributing workpieces, which are sequentially supplied in the units of treatment from a preceding step, is provided corresponding to each of said corresponding devices so that the workpieces are sequentially supplied to such devices, respectively.

10. The apparatus for carburizing, quenching and tempering workpieces, according to claim 9, wherein said preheating device is provided with a high frequency induction heating device and the number of the one or more preheating devices is 1, wherein said carburizing devices is provided in such a manner that the number thereof meets a condition given by the following inequality:

$Z \geq X/Y$ where X denotes a time period taken for performing said carburizing step; Y a time interval between supplies of the workpieces in the units of treatment through said machining and manufacturing line; and Z the number of said carburizing devices.

11. The apparatus for carburizing, quenching and tempering workpieces, according to claim 9, wherein said carburizing device comprises:

a vacuum carburizing chamber;

a plasma carburizing unit for performing plasma carburizing by causing a glow discharge between said carburizing means and the workpiece; and a heating unit for maintaining the temperature of the workpiece at a carburizing temperature.

12. The apparatus for carburizing, quenching and tempering workpieces, according to claim 11, wherein said heating unit for maintaining the temperature of the workpiece at the carburizing temperature is a high frequency induction heating unit.

13. The apparatus for carburizing, quenching and tempering workpieces, as in claim 9, which further comprises:

one or more cooling devices each for performing a cooling step of cooling the workpieces to a temperature, which is not higher than A1 transformation temperature; and one or more reheating devices each for reheating the workpiece, which has been cooled by this cooling device, to a quenching temperature.

14. The apparatus for carburizing, quenching and tempering workpieces, according to claim 13, wherein said cooling device and said reheating device are provided in such a manner as to meet conditions given by the following inequalities:

$C \geq M/Y, H \geq N/Y$ where M designates a time taken to accomplish said cooling step of cooling the workpiece to a temperature which is not higher than said A1 transformation temperature; N a time taken to accomplish said reheating step of reheating the workpiece, which has been cooled in said cooling step, to the quenching temperature; Y the time interval between the supplies of the workpieces in the units of treatment through said machining and manufacturing line; C the number of said cooling devices for performing said cooling step; and H the number of the said reheating devices for performing said reheating step.

15. The apparatus for carburizing, quenching and tempering workpieces, as in claim 9, wherein said tempering devices for performing a tempering step are provided in such a manner as to meet a condition given by the following inequality:

$W \geq L/Y$ where L denotes a time period taken for performing said tempering step; Y the time interval between the supplies of the workpieces in the units of treatment through said machining and manufacturing line; and W the number of said tempering devices for performing said tempering step.

* * * * *